United States Patent Office 3,556,807
Patented Jan. 19, 1971

3,556,807
MEAT TENDERIZATION PROCESS
Willie Woo, c/o Baker & McKenzie, C.P.O. Box 1576,
Tokyo, Japan
No Drawing. Filed Sept. 1, 1967, Ser. No. 664,915
Int. Cl. A22c 18/00
U.S. Cl. 99—107   1 Claim

ABSTRACT OF THE DISCLOSURE

A process for tenderizing meat comprising a first soaking in a sodium bicarbonate bath and a second soaking in a vinegar bath followed by a water rinse.

---

This invention relates to a process for treating meats in order to make them tender and easily assimilable and it more specifically relates to a process for tenderizing meat by treatment with sodium bicarbonate and vinegar.

Heretofore the tenderizing of tough meats, i.e. those having resilient connecting tissues, has been effected for the most part by the application of proteolytic enzymes such as papain. It is known that papain has undesirable effects on the meat such as loss of color, loss of firmness and an objectionable flavor and aroma. Control of these effects has been most difficult and time consuming. It is a primary object of the instant invention to provide a process for tenderizing meat which does not utilize papain and which does not meaningfully exhibit any of the undesirable characteristics of papain.

Another object of the invention is to provide a process for tenderizing meat which is simple and effective and which utilizes readily available substances.

A further object of the invention is to provide a process for tenderizing meat utilizing sodium bicarbonate and vinegar.

The improved process involves two separate uncomplicated soaking periods followed by a water bath. The simplicity of the process renders it most efficacious for the commercial processor as well as for the housewife in the home. As carried out in practice, the process first requires a tenderizing solution of sodium bicarbonate. The strength of the solution is variable and depends upon the cut and the thickness of the meat as well as the grade of the meat. The stronger the solution, the less time that submersion is necessary in the tenderizing bath.

In the practice of the inventive process, a solution made with one part by weight of sodium bicarbonate to approximately ten parts by weight of water (1 oz. NaHCO$_3$ to 10 fl. oz. H$_2$O) was sufficient to tenderize a piece of steak size beef 1 in. in thickness which was soaked therein for 2 hours at a temperature between 40 to 50° F. Successful results have also been derived from a solution having one part by weight of sodium bicarbonate to approximately fifty parts by weight of water (⅔ oz. NaHCO$_3$ to 1 qt. H$_2$O) with the meat soaked therein for 24 hours at a temperature between 40 to 50° F. The strength of the tenderizing solution may be fixed anywhere between the above limits without jeoparidizing the tenderizing process so long as a proportionate change is made in the length of the submersion or soaking period.

Uniform results for large volumes of meat of less than 2 in. thickness is obtainable by utilizing a solution having one part by weight of sodium bicarbonate for thirty-three parts by weight of water (4 oz. NaHCO$_3$ to 1 gal. H$_2$O) when the water is maintained at 40 to 50° F. The optimum temperature range of 40 to 50° F. is advantageous not only because it is easily obtained by the use of conventional refrigerating equipment but also because it aids in preserving the meat during processing. However, the temperature range may be expanded to from 32 to 60° F. with successful results still being achieved. It has been found that at temperatures below 32° F., the tenderizing solution becomes inactive whereas at temperatures above 60° F., the sodium bicarbonate solution is in effect weakened to a point where it loses its practical efficiency.

After the meat has been soaked in the sodium bicarbonate bath for the proper length of time, it is removed and placed into a vinegar bath wherein the acetic acid components of the vinegar will act to neutralize the sodium bicarbonate and thereby halt the tenderizing process. The vinegar bath soak lasts for 30 minutes at which time the meat is removed and cleansed under running water for 20 minutes and then drained.

The product resulting from the above process will be a meat portion which has been tenderized through a chemical transformation caused by the reaction of the sodium bicarbonate with the organic substance and structure of the meat whereby the connective tissues weakened.

What has been set forth above is intended primarily as exemplary to enable those skilled in the art in the practice of the invention and it should therefore be understood that, within the scope of the appended claim, the invention may be practiced in other ways than as specifically described.

What is new and, therefore, desired to be protected by Letters Patent of the United States is:

1. A method of tenderizing meat comprising the steps of soaking the meat of less than 2 inches in thickness in a first bath of a solution of sodium bicarbonate and water in the amount of 1% sodium bicarbonate to 10% by weight of the water in said solution, soaking said meat in said first bath from 2 to 24 hours, maintaining said bath at a temperature of between 32° F. and 60° F., soaking said meat in a second bath of vinegar for approximately 30 minutes, rinsing said meat with water, and draining the meat.

References Cited

UNITED STATES PATENTS

| | | | |
|---|---|---|---|
| 2,903,362 | 9/1959 | Beuk et al. | 99—107 |
| 2,904,442 | 9/1959 | Uhderkofler | 99—159X |

HYMAN LORD, Primary Examiner